(12) United States Patent
Oyama et al.

(10) Patent No.: US 9,719,481 B2
(45) Date of Patent: Aug. 1, 2017

(54) CONTROL DEVICE

(71) Applicant: HITACHI AUTOMOTIVE SYSTEMS, LTD., Hitachinaka-shi, Ibaraki (JP)

(72) Inventors: Katsuya Oyama, Hitachinaka (JP); Chihiro Sato, Hitachinaka (JP); Mitsuhiko Watanabe, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/646,174

(22) PCT Filed: Oct. 25, 2013

(86) PCT No.: PCT/JP2013/078892
§ 371 (c)(1),
(2) Date: May 20, 2015

(87) PCT Pub. No.: WO2014/080722
PCT Pub. Date: May 30, 2014

(65) Prior Publication Data
US 2015/0292466 A1 Oct. 15, 2015

(30) Foreign Application Priority Data

Nov. 26, 2012 (JP) ................. 2012-257353

(51) Int. Cl.
*F02P 9/00* (2006.01)
*H04L 1/08* (2006.01)
(Continued)

(52) U.S. Cl.
CPC .............. *F02P 9/002* (2013.01); *F02D 41/26* (2013.01); *F02D 41/266* (2013.01); *H04L 1/08* (2013.01);
(Continued)

(58) Field of Classification Search
CPC .... F02P 9/002; F02D 41/26; F02D 2041/286; F02D 2250/12; H04L 29/08; H04L 1/08
See application file for complete search history.

(56) References Cited

U.S. PATENT DOCUMENTS 4,933,862 A * 6/1990 Wataya ................. F02D 41/266
123/480
4,989,150 A * 1/1991 Tazawa ................. F02D 41/123
701/101
(Continued)

FOREIGN PATENT DOCUMENTS

JP 63-202148 A 8/1988
JP 05-262190 A 10/1993
(Continued)

OTHER PUBLICATIONS

The EESR issued on Sep. 27, 2016. EP Application No. 13856368.9.

*Primary Examiner* — Hieu T Vo
*Assistant Examiner* — Sherman Manley
(74) *Attorney, Agent, or Firm* — Volpe and Koenig, P.C.

(57) ABSTRACT

The invention, while reducing noise, suppresses a load increase in a processor and a delay in drive control. An engine control unit includes a processor, a driving circuit including a switching element to drive a load such as a fuel injector and an ignition device, and a communication circuit that transmits control signals from the processor to the driving circuit via serial communication. The control signals each include a command frame for controlling the driving circuit and a data frame for driving the load. If a predetermined bits in each of the data frames received from the processor at predetermined time intervals are determined to be the same twice in succession, the engine control unit
(Continued)

changes a state of a driving signal 'Drive' for driving the load and thereby changes an operating state of the switching element.

7 Claims, 10 Drawing Sheets

(51) Int. Cl.
*H04L 29/08* (2006.01)
*F02D 41/26* (2006.01)
*F02D 41/28* (2006.01)

(52) U.S. Cl.
CPC ........ *H04L 29/08* (2013.01); *F02D 2041/286* (2013.01); *F02D 2250/12* (2013.01)

(56) References Cited

U.S. PATENT DOCUMENTS

| | | | | |
|---|---|---|---|---|
| 5,263,450 A * | 11/1993 | Hashimoto | ........... | F02D 41/009 123/406.62 |
| 5,775,296 A * | 7/1998 | Goras | ................. | B60R 16/0315 123/406.47 |
| 6,845,315 B2 * | 1/2005 | Hashimoto | ........... | F02D 11/107 123/396 |
| 6,999,869 B1 * | 2/2006 | Gitlin | .................... | F02D 41/263 123/406.58 |
| 7,126,463 B2 * | 10/2006 | Bauerle | .................. | B60K 26/02 340/439 |
| 8,078,339 B2 * | 12/2011 | Oakes | ................. | H01M 10/441 701/1 |
| 8,560,124 B2 * | 10/2013 | Oakes | .................... | G06Q 40/00 700/276 |
| 9,164,696 B2 * | 10/2015 | Abe | ........................ | G06F 8/665 |
| 9,323,595 B2 * | 4/2016 | Yamada | .............. | G06F 11/0739 |
| 2002/0029098 A1 * | 3/2002 | Sakurai | .................... | B60T 8/885 701/1 |
| 2004/0230347 A1 | 11/2004 | Sakurai et al. | | |
| 2008/0046163 A1 | 2/2008 | Kagleder | | |

FOREIGN PATENT DOCUMENTS

| | | |
|---|---|---|
| JP | 06-204989 A | 7/1994 |
| JP | 09-214565 A | 8/1997 |
| JP | 2001-075608 A | 3/2001 |
| JP | 2004-339977 A | 12/2004 |
| JP | 2006-329129 A | 12/2006 |
| JP | 2010-116165 A | 5/2010 |
| JP | 2011-174397 A | 9/2011 |
| WO | 2006/094608 A1 | 9/2006 |

* cited by examiner

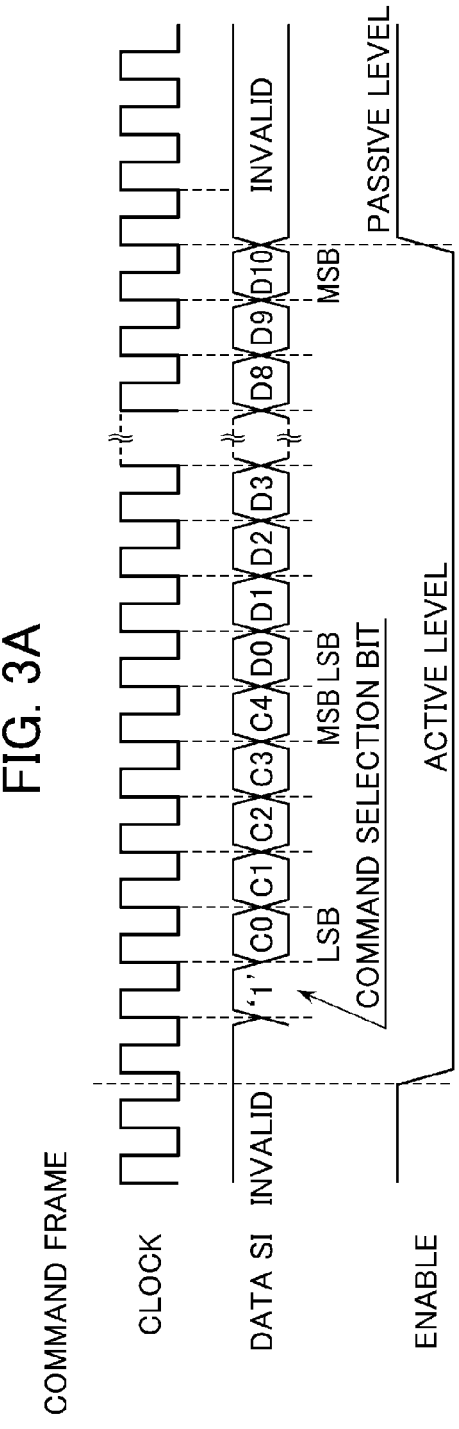
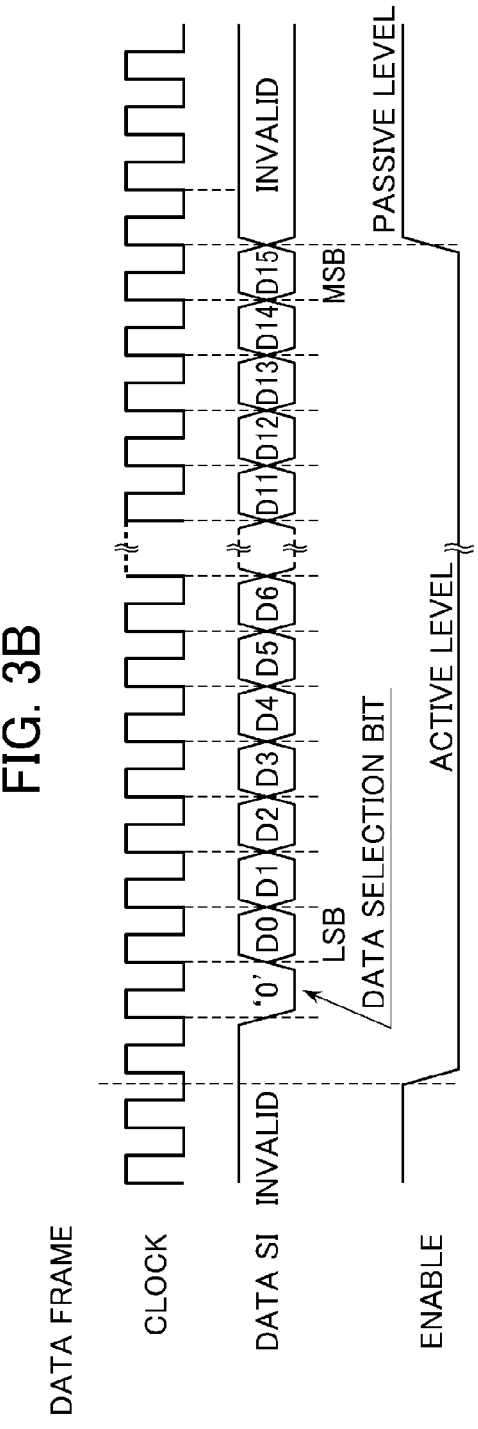

FIG. 11

3-CYLINDER

| TRUE \ FALSE | #1 CYLINDER IGN | #2 CYLINDER IGN | #3 CYLINDER IGN |
|---|---|---|---|
| #1 CYLINDER IGN |  | ×(BF) | ○ |
| #2 CYLINDER IGN | ○ |  | ×(BF) |
| #3 CYLINDER IGN | ×(BF) | ○ |  |

×(BF): BACKFIRE POTENTIAL
×(EI): SIGNIFICANT ENGINE IMPACTS DUE TO TOO EARLY IGNITION
○: NO ENGINE DAMAGE

4-CYLINDER

| TRUE \ FALSE | #1 CYLINDER IGN | #3 CYLINDER IGN | #4 CYLINDER IGN | #2 CYLINDER IGN |
|---|---|---|---|---|
| #1 CYLINDER IGN |  | ×(BF) | ○ | ○ |
| #3 CYLINDER IGN | ○ |  | ×(BF) | ○ |
| #4 CYLINDER IGN | ○ | ○ |  | ×(BF) |
| #2 CYLINDER IGN | ×(BF) | ○ | ○ |  |

6-CYLINDER

| TRUE \ FALSE | #1 CYLINDER IGN | #2 CYLINDER IGN | #3 CYLINDER IGN | #4 CYLINDER IGN | #5 CYLINDER IGN | #6 CYLINDER IGN |
|---|---|---|---|---|---|---|
| #1 CYLINDER IGN |  | ○ | ○ | ○ | ×(BF) | ×(EI) |
| #2 CYLINDER IGN | ×(EI) |  | ○ | ○ | ○ | ×(BF) |
| #3 CYLINDER IGN | ×(BF) | ×(EI) |  | ○ | ○ | ○ |
| #4 CYLINDER IGN | ○ | ×(BF) | ×(EI) |  | ○ | ○ |
| #5 CYLINDER IGN | ○ | ○ | ×(BF) | ×(EI) |  | ○ |
| #6 CYLINDER IGN | ○ | ○ | ○ | ×(BF) | ×(EI) |  |

8-CYLINDER

| TRUE \ FALSE | #1 CYLINDER IGN | #8 CYLINDER IGN | #7 CYLINDER IGN | #3 CYLINDER IGN | #6 CYLINDER IGN | #5 CYLINDER IGN | #4 CYLINDER IGN | #2 CYLINDER IGN |
|---|---|---|---|---|---|---|---|---|
| #1 CYLINDER IGN |  | ×(EI) | ×(BF) | ×(BF) | ○ | ○ | ○ | ○ |
| #8 CYLINDER IGN | ○ |  | ×(EI) | ×(BF) | ×(BF) | ○ | ○ | ○ |
| #7 CYLINDER IGN | ○ | ○ |  | ×(EI) | ×(BF) | ×(BF) | ○ | ○ |
| #3 CYLINDER IGN | ○ | ○ | ○ |  | ×(EI) | ×(BF) | ×(BF) | ○ |
| #6 CYLINDER IGN | ○ | ○ | ○ | ○ |  | ×(EI) | ×(BF) | ×(BF) |
| #5 CYLINDER IGN | ×(BF) | ○ | ○ | ○ | ○ |  | ×(EI) | ×(BF) |
| #4 CYLINDER IGN | ×(BF) | ×(BF) | ○ | ○ | ○ | ○ |  | ×(EI) |
| #2 CYLINDER IGN | ×(EI) | ×(BF) | ×(BF) | ○ | ○ | ○ | ○ |  |

CONTROL DEVICE

TECHNICAL FIELD

The present invention relates to control devices that drive an ignition device, a fuel injector, and other loads.

BACKGROUND ART

To enhance internal-signal transmission efficiency for a control device used to drive a load, a system is proposed that uses serial communication to transmit control signals from a processor to a driving circuit including a switching element. During the serial communication, the superimposition of minuscule noise, which may not be taken into consideration in a transmission system based on a parallel communication, is problematic because a large number of control signals are transmitted through one serial communication line. As described in JP-1994-204989-A (Patent Document 1), accordingly, a technique for transmitting or receiving the same data twice in succession is proposed for improvement in the reliability of communication.

PRIOR ART DOCUMENTS

Patent Documents

Patent Document 1: JP-1994-204989-A

SUMMARY OF THE INVENTION

Problems to be Solved by the Invention

If the same data is transmitted or received twice in succession in a control device that drives a load, however, a delay in drive control of the load to be driven will occur in addition to an increase in processor load. The delay in the drive control of the load to be driven is liable to result in an inconvenience such as reduced engine response.

The present invention is intended to provide a control device that prevents both an increase in processor load and a delay in drive control while at the same time reducing noise.

Means for Solving the Problems

The control device includes a processor, a driving circuit including a switching element to drive loads, and a communication circuit that transmits control signals from the processor to the driving circuit via serial communication. The driving circuit changes an operating state of the switching element if the control signals received from the processor at predetermined intervals of time are determined to have the same data when detected a predetermined number of times in succession.

Effects of the Invention

An increase in processor load and a delay in drive control can be suppressed while at the same time reducing noise.

BRIEF DESCRIPTION OF THE DRAWINGS

FIG. 3 shows details of a control signal, with section (A) of the figure being an explanatory diagram of a command frame and (B) of the figure being an explanatory diagram of a data frame.

FIG. 11 is an explanatory diagram of a table for controlling an ignition device.

MODES FOR CARRYING OUT THE INVENTION

Figure 1:
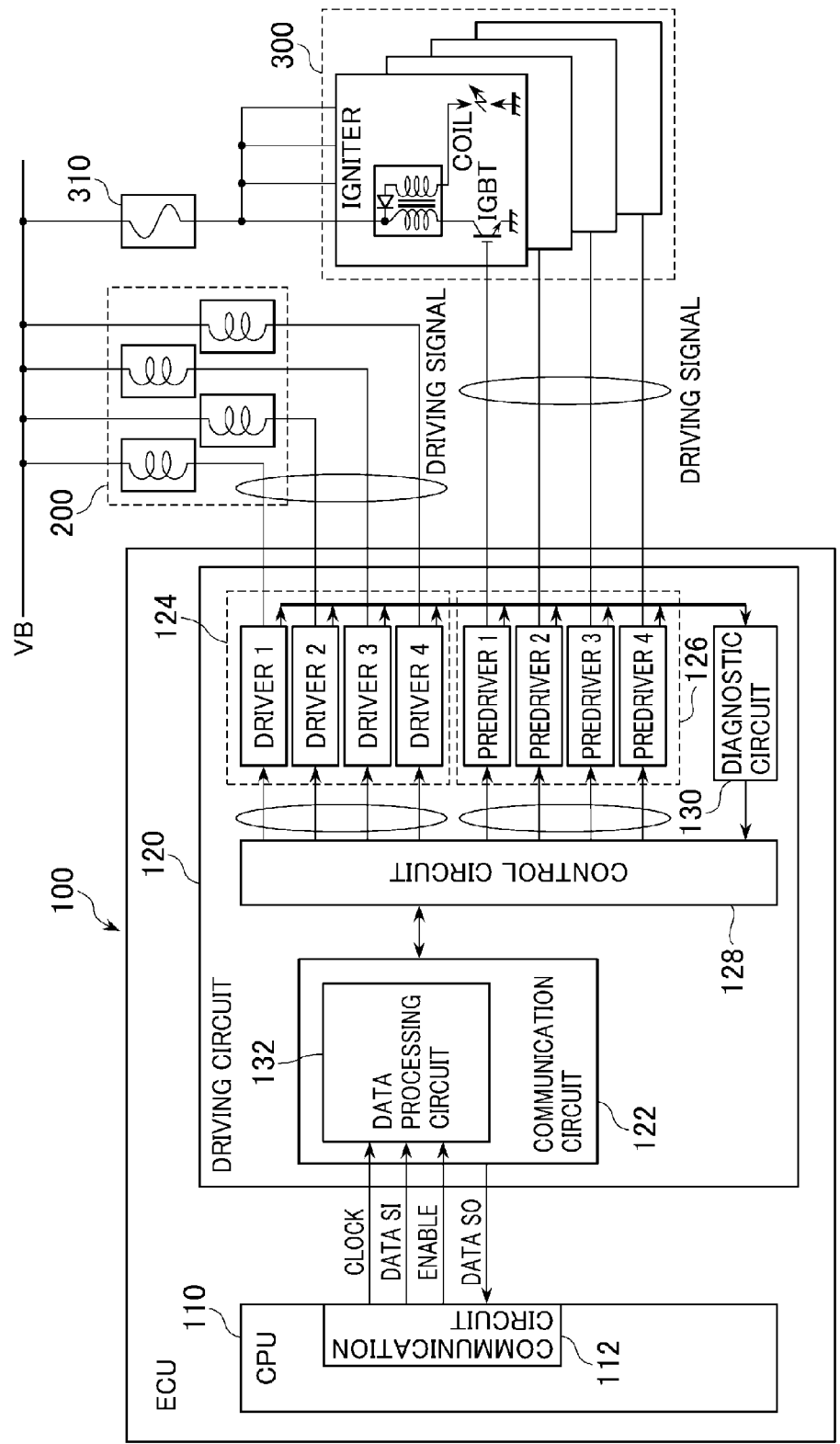
FIG. 1 is a configuration diagram of an engine control unit according to a first embodiment of the present invention.

Hereunder, embodiments of the present invention will be described in detail with reference to the accompanying drawings.

Since the drawings are simplified, the technical scope of the present invention should not be narrowly interpreted on the grounds of the description of the drawings. The same reference number is assigned to each of the same elements in the drawings, and description of these elements is omitted.

First Embodiment

FIG. 1 shows an example of a control device for driving loads, the control device being an engine control unit (hereinafter referred to as the ECU) 100, which drives a fuel injector and ignition device of a four-cylinder gasoline engine. Application of the ECU 100 is not limited to driving loads of a four-cylinder gasoline engine. The ECU 100 can also be applied to driving loads of other non-four-cylinder gasoline engines, diesel engines with a given number of cylinders, and the like. The same applies hereinafter.

The ECU 100 includes a CPU 110 (processor) that generates a timing signal for driving the fuel injector 200 and ignition device 300 of the four-cylinder gasoline engine as examples of loads, and a driving circuit 120 that drives the fuel injector 200 and the ignition device 300.

In accordance with a control program previously stored within a non-volatile memory such as a flash memory, the CPU 110 calculates actuation timing of the fuel injector 200 and the ignition device 300 on the basis of, for example, a particular operating state of a vehicle equipped with the engine, and outputs a control signal to the driving circuit 120 in that timing. For this reason, the CPU 110 contains a communication circuit 112 that exchanges various signals with the driving circuit 120 via serial communication.

The driving circuit 120 includes a communication circuit 122 for exchanging various signals with the CPU 110 by means of serial communication, an injector driver 124 that outputs a driving signal to the fuel injector 200, an igniter pre-driver 126 that outputs a driving signal to the ignition device 300, and a control circuit 128 that controls the injector driver 124 and the igniter pre-driver 126. The injector driver 124 and the igniter pre-driver 126 both include a switching element to drive the loads. The driving circuit 120 includes a diagnostic circuit 130 to diagnose whether an abnormality is occurring in the fuel injector 200 and the ignition device 300. A diagnostic result signal from the diagnostic circuit 130 is input to the control circuit 128.

The communication circuit 112 of the CPU 110 and the communication circuit 122 of the driving circuit 120 are connected via four signal lines that transmit a clock signal (Clock), an enable signal (Enable), a data input signal (Data SI), and a data output signal (Data SO). Examples of control signals include the clock signal (Clock), the enable signal (Enable), and the data input signal (Data SI). The diagnostic result signal from the diagnostic circuit 130 is, for example, the data output signal (Data SO).

A data processing circuit 132, processing the control signal that has been transmitted from the CPU 110 and then outputting a driving signal to the injector driver 124 and the igniter pre-driver 126 via the control circuit 128, is built into the communication circuit 122 of the driving circuit 120. The data processing circuit 132 is, however, not always built into the communication circuit 122. Instead, the data processing circuit 132 may be incorporated into the control circuit 128 or exist as an independent circuit.

The fuel injector 200 is an electromagnetic valve whose coil operates in accordance with the driving signal from the injector driver 124 and whose needle valve portion biased in a direction to close the valve is thereby lifted to cause it to inject a fuel. The ignition device 300, which includes an IGBT (Insulated-Gate Bipolar Transistor), a coil, and an igniter (ignition plug), activates the IGBT in accordance with the driving signal from the igniter pre-driver 126, thereby energizing the coil to cause the igniter to generate sparks.

Reference symbol VB and reference number 310 denote respectively a power supply voltage line and a fuse for protecting the ignition device 300.

Figure 2:
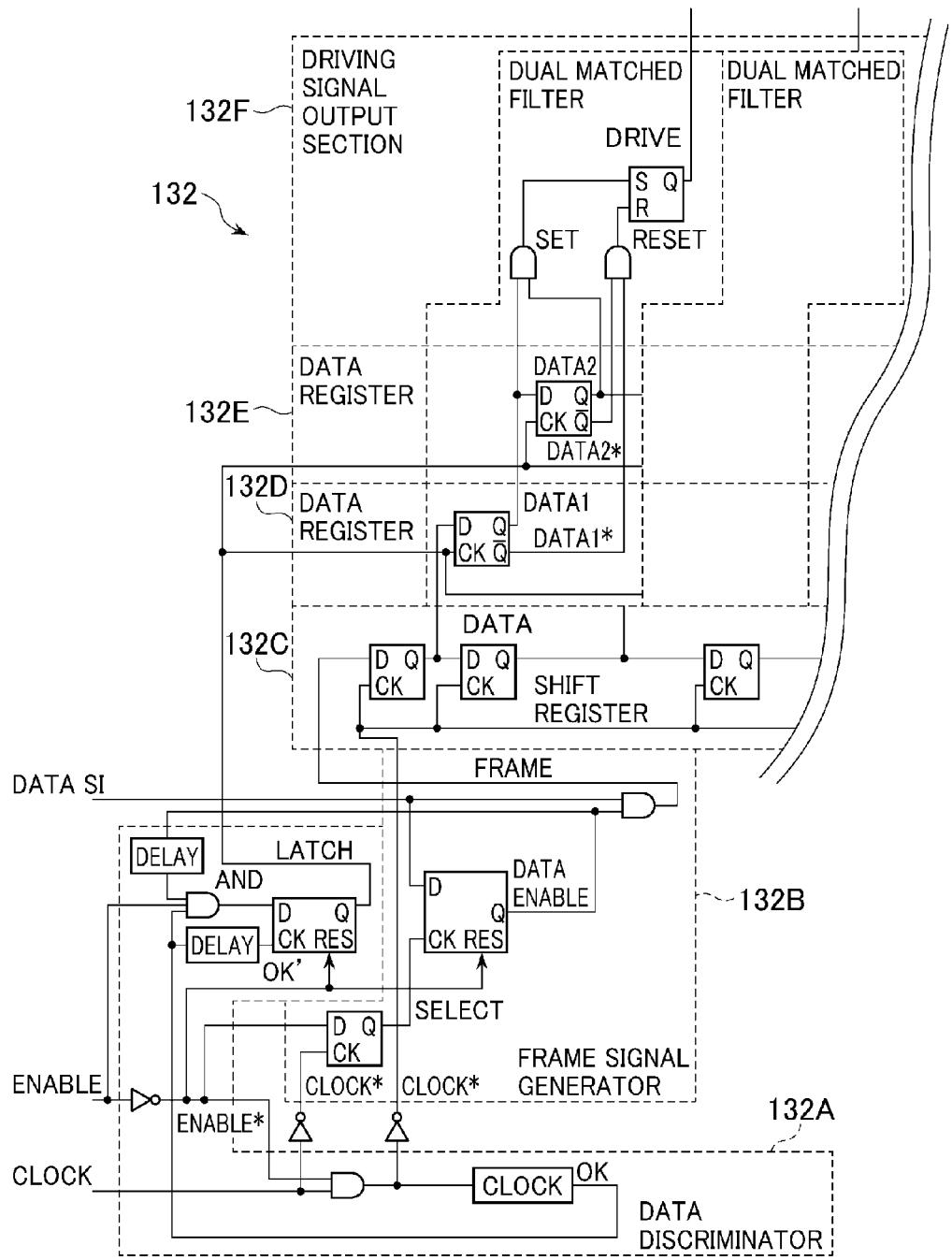
FIG. 2 is a circuit diagram showing an example of a data processing circuit.

As shown in FIG. 2, the data processing circuit 132, constructed by arranging and connecting AND circuits, NOT circuits, an SR flip-flop, D flip-flops, a delay circuit, a clock counter, and other elements, includes a data discriminator 132A, a frame signal generator 132B, a shift register 132C, data registers 132D and 132E, and a driving signal output section 132F.

The data discriminator 132A counts the number of Clock signals generated while the Enable signal that has been received from the CPU 110 is active, and determines whether the Data SI signal that has been received during the counting of the Clock signals is valid or invalid. In addition to making this determination, the data discriminator 132A generates a data latch signal (Latch) that defines acquisition timing of the data input signal (Data SI). On the basis of the Clock signal and the Enable signal, the frame signal generator 132B generates data Frame signals that each define in what timing a data frame is to be generated from the Data SI signal. The shift register 132C, after receiving the data Frame signals from the frame signal generator 132B, acquires Data SI signals in order and generates data frames of a predetermined bits. The data register 132D, after receiving the data Latch signal from the data discriminator 132A, reads in a data frame from the shift register 132C and holds the data frame. The data register 132E, after receiving the data Latch signal from the data discriminator 132A, reads in a data frame from the shift register 132D and holds the data frame. The data register 132E, therefore, holds the data frame that is older in time than the data frame held in the data register 132D. The driving signal output section 132F compares the data frames held in the data registers 132D and 132E, and when these data frames are the same, outputs a driving signal to a control circuit 128.

The data registers 132D and 132E and the driving signal output section 132F form a dual matched filter for checking whether two data registers that are continuous in time are the same regarding each bit of each data frame.

The control signals exchanged between the CPU 110 and the driving circuit 120 will now be described.

As shown in FIG. 3, two kinds of control signals are generated: one is a command frame and the other is a data frame. Examples of a command frame include a control command transmitted from the CPU 110 to the driving circuit 120, and the diagnostic result by the diagnostic circuit 130 transmitted from the driving circuit 120 to the CPU 110. Examples of a data frame include the data transmitted from the CPU 110 to the driving circuit 120 in order to control the injector driver 124 and the igniter pre-driver 126. As shown in FIG. 3(A), the command frame includes a 1-bit command selection bit '1', which indicates that the signal is the command frame. The command frame also includes 5-bit command bits C0 to C4, and 11-bit data bits D0 to D10. As shown in FIG. 3(B), the data frame includes a 1-bit command selection bit '0', which indicates that the signal is the data frame, and 16-bit data bits D0 to D15. The command frame and the data frame, therefore, have a format in which they can be discriminated from each other by polarity of the first bit immediately after the Enable signal has become active (Active Level). The bits D0 to D15 in the data frame, allocated to drivers that drive the loads to be driven, configure a control signal that controls each of the drivers.

Figure 4:
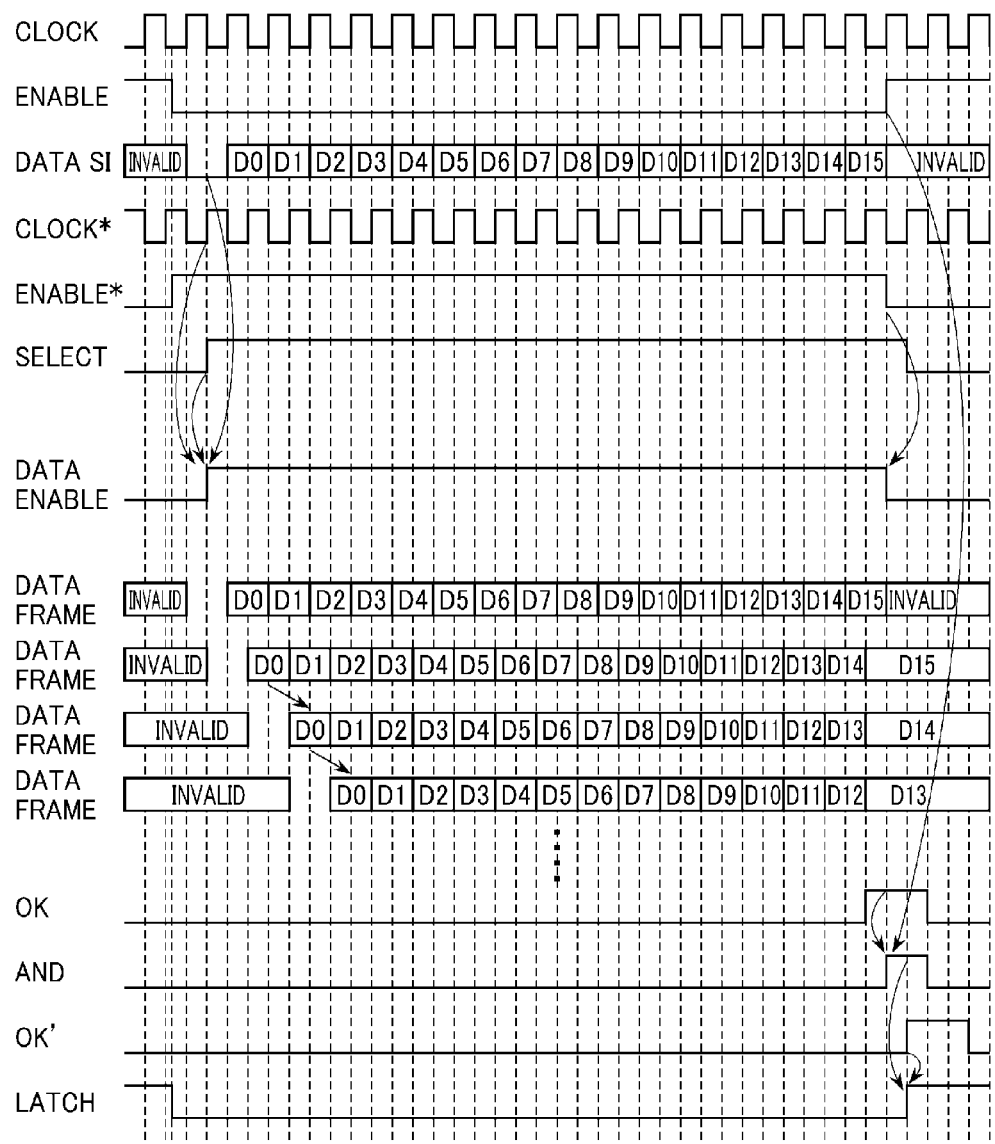
FIG. 4 is a timing chart that illustrates operation of the data processing circuit.
Figure 5:
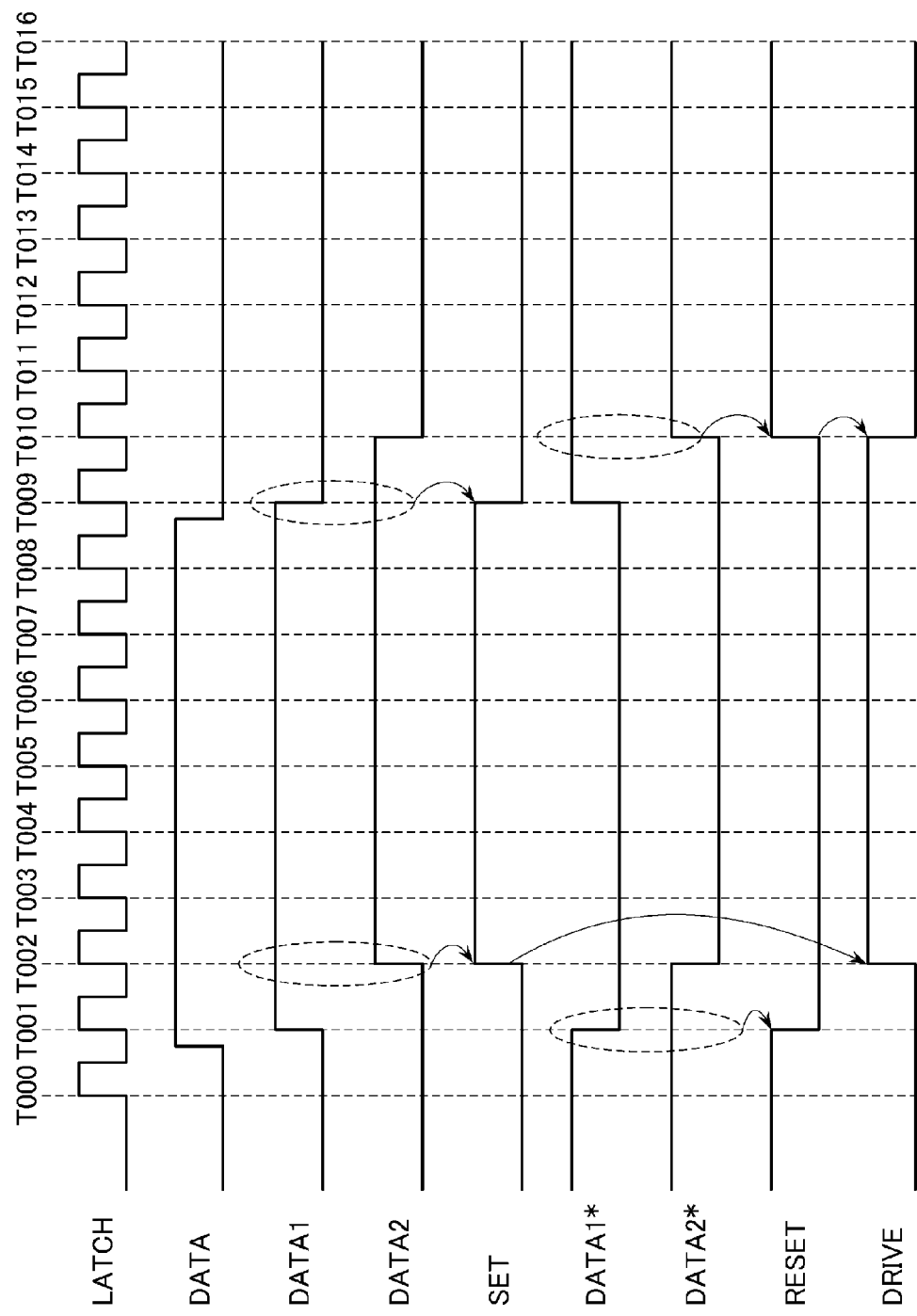
FIG. 5 is a timing chart that illustrates operation of the data processing circuit.

FIG. 4 is a timing chart that illustrates operation of the data processing circuit 132.

The Clock signal that has been input to the data processing circuit 132 is inverted by a NOT circuit, thereby becoming an inverted Clock signal 'Clock*'. The Enable signal that has been input to the data processing circuit 132 is inverted by another NOT circuit, thereby becoming an inverted Enable signal 'Enable*'. One D flip-flop of the frame signal generator 132B latches the inverted Enable signal 'Enable*' at a rising edge of the inverted Clock signal 'Clock*' and generates a data selection bit latch signal 'Select' that latches polarity of a data selection bit. When the data selection bit latch signal 'Select' is input, if the Data SI signal is in a Low (0) state, other D flip-flops of the frame signal generator 132B each output a Data Enable signal 'Data Enable'. One AND circuit of the frame signal generator 132B outputs to the shift register 132C a data Frame signal 'Frame', which is a logical product between the data input signal 'Data SI' and the Data Enable signal 'Data Enable'. While the data Frame signal 'Frame' is output, the shift register 132C that has received the data Frame signal 'Frame' from the frame signal generator 132B holds or unfolds the signal, as determined by a condition of the inverted Clock signal 'Clock*' obtained by inversion of a logical product between the inverted Enable signal 'Enable*' and the Clock signal 'Clock'.

The number of events in which the Clock signal 'Clock' that is input while the Enable signal 'Enable' is active (Low) is counted by the clock counter of the data discriminator 132A. The clock counter then outputs a data count OK signal 'OK' when the number of counted Clock signal 'Clock' is normal, that is, when the Clock signal count in the data frame of FIG. 3 is 16. Other AND circuits of the frame signal generator 132B each output a logical product signal 'And' denoting a logical product between the Enable signal 'Enable' and the data count OK signal 'OK'. A delayed data count OK signal (OK') that the delay circuit has created by delaying the data count OK signal 'OK', and the logical product signal 'And', are input to a D flip-flop. The D flip-flop in turn outputs the data Latch signal 'Latch' denoting that the data frame is normal and the Enable signal 'Enable' is in a HIGH state. This means, therefore, that the data Latch signal 'Latch' is output each time one data frame is properly received.

Operation of the data processing circuit 132 during reception of a plurality of data frames will now be described.

A Data signal 'Data' of a predetermined bits in the data frame held in the shift register 132C is latched by a D flip-flop of the data register 132D on the basis of the data Latch signal 'Latch' output every time a data frame is properly received. The Data signal 'Data' that has been latched by this D flip-flop of the data register 132D is further latched by a D flip-flop of the data register 132E on the basis of the data Latch signal 'Latch'. In other words, the data frames that have been received continuously in time are held in the data registers 132D and 132E.

The Data signal thus held in the data registers 132D and 132E is input from a Q-terminal of the D flip-flop to an S-terminal of the SR flip-flop in the driving signal output section 132F as data signals Data1 and Data2 while being logically multiplied by an AND circuit. In addition, the Data signal 'Data' held in the data registers 132D and 132E is input from an inverted Q-terminal of the D flip-flop to an R-terminal of the SR flip-flop in the driving signal output section 132F as inverted data signals 'Data1*' and 'Data2*' while being logically multiplied by another AND circuit. Accordingly, at a rising edge of the data Latch signal, the SR flip-flop outputs a driver setting signal 'Set' if HIGH is detected twice in succession, or outputs a driver resetting signal 'Reset' if LOW is detected twice in succession.

In this way, the predetermined bits in the data frame are latched in two stages by the data Latch signal that is output each time a data frame is properly received. If the predetermined bits are determined to be HIGH twice in succession after their comparison, the driving signal 'Drive' also becomes HIGH to drive the loads. If the predetermined bits are determined to be LOW twice in succession, the driving signal 'Drive' also becomes LOW to stop the driving of the loads.

Figure 6:
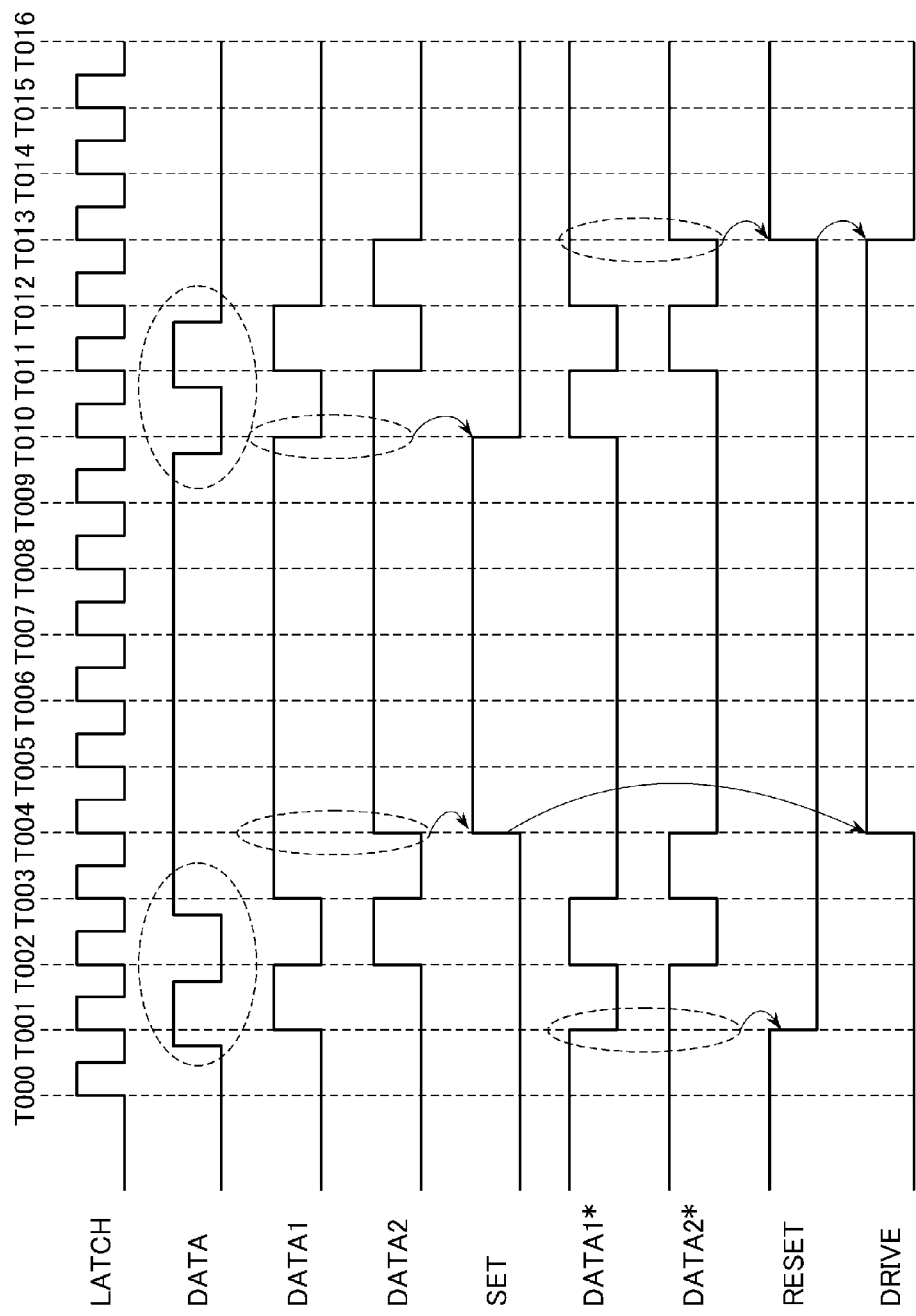
FIG. 6 is a timing chart that illustrates operation of the data processing circuit.

By contrast, after temporarily rising to become HIGH in T001 timing as shown in FIG. 6, if the Data signal returns to LOW in T002 timing and then becomes HIGH in T003 timing again, the driver setting signal 'Set' is output in T004 timing. The opposite applies when the Data signal falls. That is to say, after temporarily becoming LOW in T010 timing, if the Data signal returns to HIGH in T011 timing and then becomes LOW in T012 timing again, the driver resetting signal 'Reset' is output in T013 timing.

In this way, if the predetermined bits in the data frame, latched in two stages by the data Latch signal 'Latch' that is output each time a data frame is properly received, do not become HIGH twice in succession after their comparison, the driving signal 'Drive' does not become HIGH either and stays as it is. Conversely if the predetermined bits does not become LOW twice in succession, the driving signal 'Drive' does not become LOW either and stays as it is.

Figure 7:
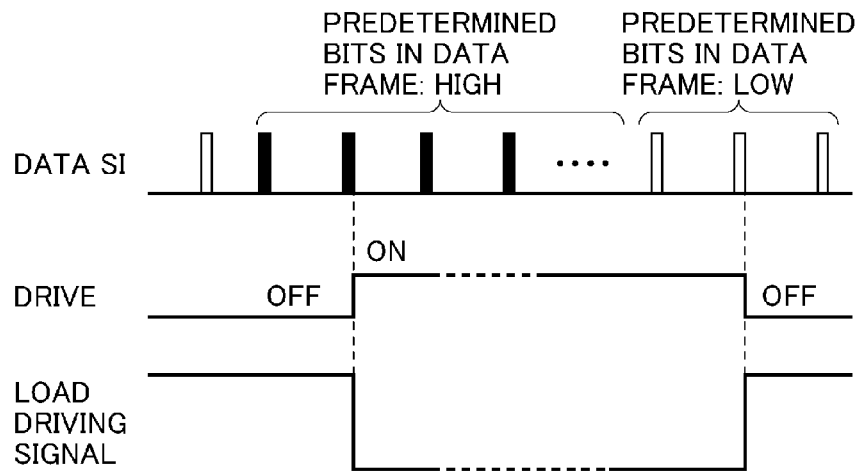
FIG. 7 is a timing chart that illustrates a control condition of loads.

Briefly, as shown in FIG. 7, if HIGH is detected twice in succession for the predetermined bits in the data frame, the driving signal 'Drive' switches from LOW (OFF) to HIGH (ON). In other words, the driving signal that is output from the ECU 100 to the fuel injector 200 or the ignition device 300 changes the state, as shown in FIG. 7. Conversely if LOW is detected twice in succession for the predetermined bits in the data frame, the driving signal 'Drive' switches from HIGH to LOW. In other words, the driving signal that is output from the ECU 100 to the fuel injector 200 or the ignition device 300 changes its condition as shown in FIG. 7.

In the event that for a reason of a surge or external radio waves, noise is superimposed upon the control signal transmitted from the CPU 110 to the driving circuit 120, unless the predetermined bits in the data frame become HIGH or LOW twice in succession, the condition of the driving signal that is output from the ECU 100 to the loads will remain unchanged. Consequently, an increase in a load of the CPU 110 and a delay in drive control can both be suppressed while the noise is reduced. At this time, since the control signal transmitted from the CPU 110 to the driving circuit 120 defines a control condition synchronized with the Clock signal 'Clock', in case that a delay in drive control occurs, the delay is still negligibly smaller than that estimated to occur in a technique used to transmit/receive the same data frame twice in succession, as in prior art.

While in the first embodiment a data frame has been latched in two stages, when a data frame is latched in at least three stages and the predetermined bits in the data frame become HIGH or LOW a predetermined number of times in succession, the condition of the driving signal that is output from the ECU 100 to the loads may be changed (the same also applies hereinafter).

The ECU 100 also provides other advantageous effects.

Figure 8:
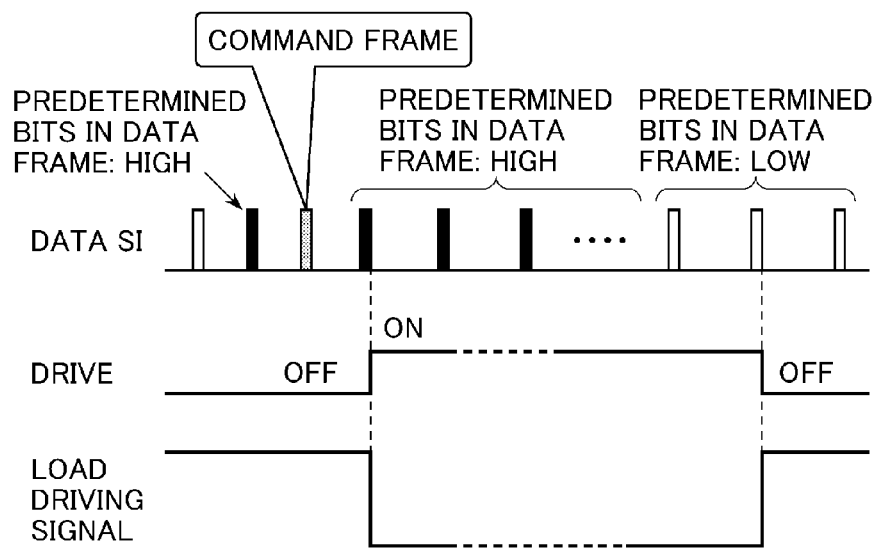
FIG. 8 is a timing chart that illustrates a load control condition in presence of a command frame transmitted to between data frames.

More specifically, since two kinds of frames formed from a command frame and a data frame are used during serial communication, the command frame might be inserted between data frames as shown in FIG. 8. In the data processing circuit 132 of FIG. 2, however, predetermined processing is executed only when the frames are data frames. The command frame inserted between the data frames therefore will not impact the counting of successive HIGH or LOW occurrences of the predetermined bits in the data frame. Accordingly the driving of the loads can be controlled with only the predetermined bits in the data frame.

Figure 9:
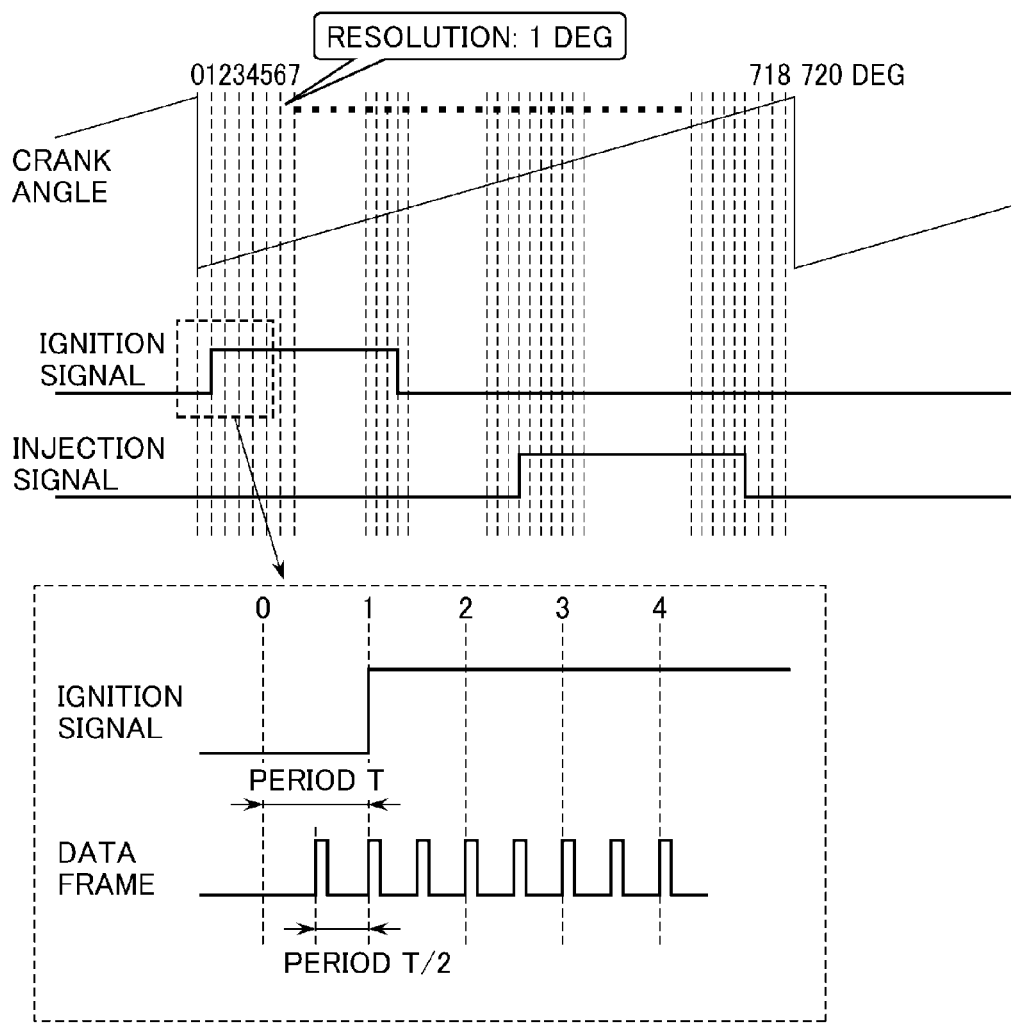
FIG. 9 is a timing chart that illustrates a serial communication period.

FIG. 9 shows an example of a timing chart relating to the drive control of the fuel injector 200 and the ignition device 300.

During the drive control of the fuel injector 200 and the ignition device 300, a rotating angle of a crankshaft of the engine (i.e., a crank angle) is detected by, for example, a rotating angle sensor with resolution expressed in steps of one degree. As shown in the figure, the states of injection signals of the fuel injector 200 and an ignition signal of the ignition device 300 change in accordance with a particular change in crank angle. That is to say, while the engine revolves through two full turns, the ignition signal and the injection signal are synchronous at predetermined resolution and changing the respective states at a predetermined angle. The number of cycles per degree of resolution in this case is expressed in terms of period T.

In the first embodiment, when the predetermined bits in the data frame become HIGH or LOW twice in succession, the driving signal that is output from the ECU 100 to the loads is caused to change in state. As shown in FIG. 9, therefore, during the drive control of the ignition device 300 at the resolution expressed in steps of one degree, the data frame is transmitted at a period of T/2 or less to prevent a delay.

In short, if the state of the driving signal is changed in synchronization with an N number of successive occurrences of a HIGH or LOW event of the predetermined bits in the data frame, the data frame has its transmission period controlled to a value equal to or less than control resolution of the fuel injector 200 and the ignition device 300, that is, equal to or less than 1/N of the period T required for the crank angle to change by one degree at a maximum engine speed.

Second Embodiment

Figure 10:
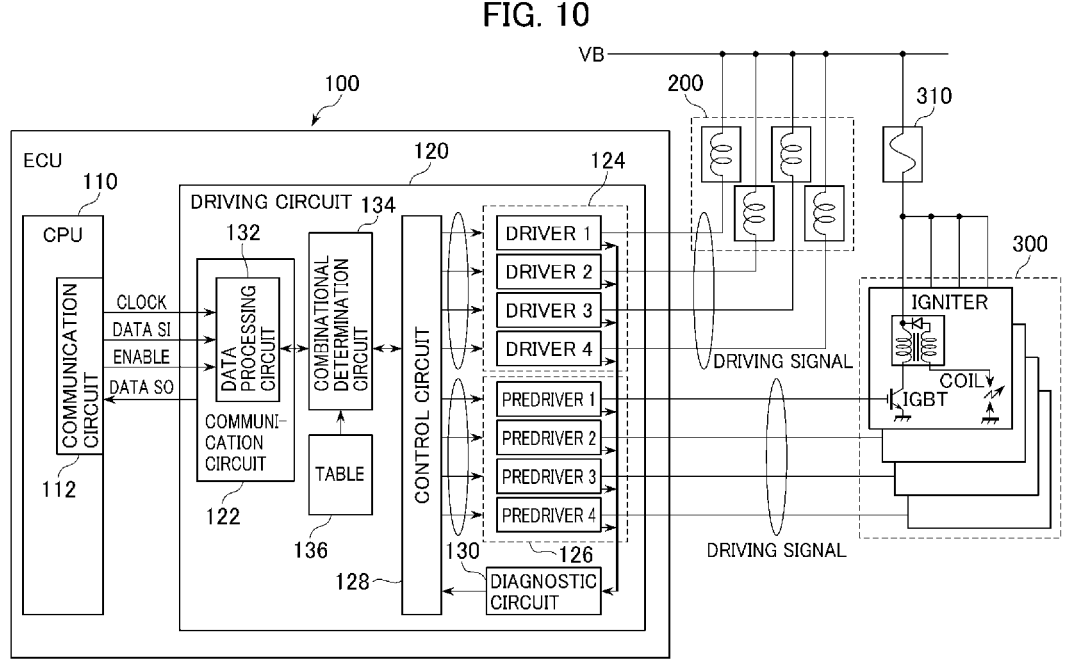
FIG. 10 is a configuration diagram of an engine control unit according to a second embodiment of the present invention.

In addition to the constituent elements of the ECU 100 in the first embodiment, an ECU 100 in a second embodiment of the present invention includes a combinational determination circuit 134 and a table 136, which are interposed between a data processing circuit 132 and a control circuit 128, as shown in FIG. 10.

The combinational determination circuit 134 determines whether engine ignition control of the ignition device 300 remains normal even if an instruction for simultaneous ignition in a plurality of cylinders is issued for a reason such as noise superimposition. The table 136 is a listing of potential impacts of multi-cylinder simultaneous ignition upon the engine, as shown in FIG. 11.

If the ECU 100 conducts ignition control of a three-cylinder engine, it is conceivable that the data bits in the data frame would be updated for a reason such as noise superimposition, followed by simultaneous ignition in two cylinders. As shown in FIG. 11, during ignition in a No. 1 cylinder, if a No. 2 cylinder is simultaneously ignited, although the engine is liable to be affected by a possible backfire, simultaneous ignition in a No. 3 cylinder will not affect the engine. In another example, during ignition in the No. 2 cylinder, the simultaneous ignition in the No. 1 cylinder does not affect the engine; however, the simultaneous ignition in the No. 3 cylinder could cause a backfire to affect the engine. In yet another example, during ignition in the No. 3 cylinder, the simultaneous ignition in the No. 1 cylinder, while possibly causing a backfire and hence affecting the engine, will not affect the engine if the No. 2 cylinder is ignited simultaneously. In other examples, during ignition control of four-cylinder, six-cylinder, and eight-cylinder engines, such impacts upon the engine as listed in FIG. 11 are also expected.

In that way, the superimposition of noise or the like upon the control signal transmitted from the CPU 110 to the driving circuit 120 could update the data bits in the data frame. The simultaneous ignition in two cylinders led by the updated data could cause a backfire or too early ignition, consequently affecting the engine. In the second embodiment, however, a combination of simultaneous ignition likely to affect the engine is stored into the table 136 beforehand and the combinational determination circuit 134 verifies the data frame which has been output from the data processing circuit 132. This avoids the potential or likely effects of simultaneous ignition upon the engine. At this time, if the combinational determination circuit 134 determines simultaneous ignition to be likely to affect the engine, the updated data frame underlying a determination that no effects are caused to the engine is used for the combinational determination circuit 134 to output the driving signal to the ignition device 300. This enables any effects upon the engine to be avoided in advance and the highly reliable ECU 100 to be achieved.

The combinational determination circuit 134 may be configured so that if the data frame for driving a plurality of ignition devices 300 is received a predetermined number of times in succession, the combinational determination circuit 134 determines at least one of the CPU 110 and the communication circuits 112 and 122 to be in trouble and deactivates the ignition devices 300 after an elapse of a predetermined time from the determination. If the combinational determination circuit 134 is configured to perform these tasks, under a trouble of the ECU 100, ignition control that could affect the engine can be avoided and the engine will be protected. To enable the vehicle to be transported to a service workshop, it is preferable that the time required for engine protection in the above case be equal to that needed for limp-home control.

For usual engine ignition control that does not cause two-cylinder simultaneous ignition, if the data bits in the data frame contain ignition control data for at least two cylinders, this data frame is determined to be abnormal, in which case the driving signal is output to the ignition device(s) 300 in accordance with the latest data frame having normal data bits. If the control device is configured to have these functions as well, combination of a simpler circuit configuration with the device configuration will enable prior determination of a data frame abnormality, hence making the ECU 100 highly reliable.

In addition to the engine control unit, for example a transmission control unit and a brake control unit can be used as the control device for driving the loads.

DESCRIPTION OF REFERENCE NUMBERS

100 ECU
110 CPU (Processor)
120 Driving circuit
122 Communication circuit
124 Injector driver
126 Igniter pre-driver
128 Control circuit
132 Data processing circuit
134 Combination determination circuit
136 Table
200 Fuel injector
300 Ignition device

The invention claimed is:

1. An engine control device comprising:
a processor;
a driving circuit including a plurality of drivers that drive electrical loads of the engine; and
a communication circuit that transmits a plurality of control signals from the processor to the driving circuit via serial communication;
wherein the driving circuit;
receives the plurality of control signals over a plurality of time frames, wherein each of the plurality of time frames is received for a predetermined interval of time and the predetermined interval of time is equal to or less than a target value obtained by dividing an amount of time needed for a crankshaft to revolve through a unit angle at a maximum allowable revolving speed of the engine by a first predetermined number of times,
determines a value for each of the plurality of control signals, and
changes an operating state of one or more of the drivers if the value is determined the first predetermined number of times in succession.

2. The engine control device according to claim 1, wherein the communication circuit includes a plurality of data registers and each of the plurality of registers stores either a first value or a second value; and
wherein the communication circuit further:

receives a clock signal, wherein the clock signal is a timing signal that alternates between a high value and a low value at fixed intervals of time, and counts a number of high values of the clock signal received while the determined value is a particular value for each of the plurality of control signals, and stores, for each of the plurality of control signals, either the first value or the second value in the one or more of the plurality of data registers based on the number of high values that are counted for each of the plurality of signals.

3. The engine control device according to claim 1, wherein:

the communication circuit includes a plurality of data registers and each of the plurality of registers stores either a first value or a second value, one or more ignition devices of the engine correspond to a particular data register from the plurality of data registers, and each ignition device is activated when the particular data register stores the first value.

4. The engine control device according to claim 3, wherein each ignition device is deactivated when the particular data register stores the second value.

5. The engine control device of claim 1, further comprising:

a combinational determination circuit communicatively coupled to the communication circuit;

a control circuit communicatively coupled to the combinational determination circuit; and a plurality of ignitor pre-driver circuits, wherein each of the ignitor pre-driver circuits is communicatively coupled to the control circuit and the plurality of drivers.

6. The engine control device of claim 5, wherein the communication circuit includes a plurality of data registers and each of the plurality of registers stores either a first value or a second value; and wherein the communication circuit:

receives the plurality of control signals from the processor, wherein each of the plurality of control signals is received over the plurality of time frames, stores, for each of the plurality of control signals, the first value in one or more of the plurality of data registers, when a high value is received for a predetermined number of consecutive time frames, and stores, for each of the plurality of control signals, the second value in one or more of the plurality of data registers, when a low value is received for the predetermined number of consecutive time frames;

wherein the combinational determination circuit:

reads the plurality of data registers, compares the plurality of data registers to a table of ignition impacts to produce a comparison result, wherein the table of ignition impacts indicate one or more effects of multi-cylinder simultaneous ignition upon the engine, and transmits, for each of the plurality of registers, an enable signal to the control circuit based on the comparison; and wherein the control circuit further:

receives the enable signal for each of the plurality of registers, and selectively activates a drive signal to each of the plurality of ignitor pre-driver circuits based on the enable signal.

7. The engine control device of claim 6, wherein the combinational determination circuit further stores, values for each of the plurality of data registers, in a memory on a condition that the comparison result indicates normal operation; and wherein the enable signal is based on the values stored in the memory on condition that the comparison result indicates abnormal operation.

* * * * *